(12) United States Patent
Creamer et al.

(10) Patent No.: US 7,085,258 B2
(45) Date of Patent: Aug. 1, 2006

(54) INSTANT MESSAGING WITH VOICE CONVERSATION FEATURE

(75) Inventors: Thomas E. Creamer, Boca Raton, FL (US); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 09/910,187

(22) Filed: Jul. 19, 2001

(65) Prior Publication Data

US 2003/0016657 A1    Jan. 23, 2003

(51) Int. Cl.
*H04L 12/66* (2006.01)
(52) U.S. Cl. ...................................... 370/352; 370/260
(58) Field of Classification Search ................ 370/352, 370/356, 357, 389, 392, 465, 471, 475, 395.2; 379/260, 202.01, 201.01, 88.17
See application file for complete search history.

(56) References Cited

U.S. PATENT DOCUMENTS

| | | | | |
|---|---|---|---|---|
| 5,483,352 | A * | 1/1996 | Fukuyama et al. | 358/402 |
| 6,694,007 | B1 * | 2/2004 | Lang et al. | 379/222 |
| 6,714,793 | B1 * | 3/2004 | Carey et al. | 455/466 |
| 6,757,365 | B1 * | 6/2004 | Bogard | 379/88.17 |
| 6,807,562 | B1 * | 10/2004 | Pennock et al. | 709/204 |
| 2002/0060988 | A1 * | 5/2002 | Shtivelman | 370/259 |
| 2002/0076025 | A1 * | 6/2002 | Liversidge et al. | 379/202.01 |
| 2003/0097325 | A1 * | 5/2003 | Friesen et al. | 705/37 |

OTHER PUBLICATIONS

U.S. Appl. No. 09/910,270, filed Jul. 19, 2001, Creamer et al.
U.S. Appl. No. 09/910,271, filed Jul. 19, 2001, Creamer et al.
U.S. Appl. No. 10/038,719, filed Jan. 3, 2002, Creamer et al.

* cited by examiner

*Primary Examiner*—Brian Nguyen
(74) *Attorney, Agent, or Firm*—Akerman Senterfitt

(57) ABSTRACT

An instant message (IM) communication method. An IM communication method can include the steps of: detecting a voice communications identifier in an IM transmitted by a sender; responsive to detecting the voice communications identifier, displaying a selectable icon; and, responsive to a selection of the icon, establishing a voice communications link with the sender. The establishing step can include the step of, responsive to the recipient selecting the voice communications identifier, establishing a Voice over IP (VoIP) based voice communications link with the recipient. Alternatively, the establishing step can include the step of, responsive to the recipient selecting the voice communications identifier, establishing a telephony-based voice communications link with the recipient over a public switched telephone network (PSTN).

37 Claims, 2 Drawing Sheets

INSTANT MESSAGING WITH VOICE CONVERSATION FEATURE

BACKGROUND OF THE INVENTION

1. Technical Field

This invention relates generally to Internet-based communication systems, and more particularly to text-based Internet communication systems such as instant messaging and on-line chat.

2. Description of the Related Art

Text-based internet communication systems such as instant messaging and chat over a data communications link have become increasingly popular due to the substantially real time nature of the communication, low cost, and simplicity of use. The instant messaging or chat (IM/Chat) client typically has a message text window in which an incoming text-based instant message (IM) can be presented to an end user. IMs that are sent by the end user through the IM/Chat client also can appear in the message text window.

IM/Chat systems work well for many communications, but there are times when clients would prefer voice communications. For example, on occasion the contents or subject matter of an IM/Chat session can give rise to a desire for voice communications. In such instances, it is usually necessary to terminate the IM/Chat session, drop the data communications link and establish a voice communications link through known methods such as a conventional telephony over the publically switched telephone network (PSTN). In such instances, the spontaneity of the conversation is lost, and details of the conversation can be forgotten. The voice communications link sometimes cannot be established, in which case all communications, both data and voice, are terminated. The extra steps necessary to establish a voice communications link will impede some from establishing such a link even when such may be necessary or desirable.

Conventional IM/Chat systems also can support the exchange of attachments. Attachments are electronic files such as images, documents or binary objects which can be attached to an IM and transmitted therewith from a sender to a recipient. Attachments can be embedded in a labeled section of an IM such that an IM client processing the IM can identify the presence of an attachment and can decode the contents of the attachment so that the attachment can be further processed by the recipient. Hence, attachments can enhance the utility of exchanging IMs and can provide a supplemental medium for communicating ideas between participants in an IM/Chat session.

Still, IM and IM attachments are not always an adequate replacement for live voice conversations between IM/Chat session participants, particularly where extensive interaction between the participants is necessary or desirable. In some instances, such conversations are necessary to explain or discuss the message text included in the IM, attached documents or audio/visual files. Moreover, a telephone sometimes is not available to the participants, or the use of a telephone requires lengthy dialing procedures which interrupts the spontaneity of the communication. Sometimes telephone access by the participants requires that at least one of the participants terminate an on-line connection to the Internet, which can disrupt the process of discussing the contents of an IM.

SUMMARY OF THE INVENTION

The present invention is an instant message (IM) processing system and method and an IM article of manufacture for use therewith. From the perspective of a person sending an IM to one or more recipients, an IM communication method in accordance with the inventive arrangements can include the steps of: inserting in an IM a voice communications identifier; transmitting the IM to a recipient; and, responsive to the recipient selecting the voice communications identifier, establishing a voice communications link with the recipient. The establishing step can include the step of responsive to the recipient selecting the voice communications identifier, establishing a Voice over IP (VoIP) based voice communications link with the recipient. Alternatively, the establishing step can include the step of, responsive to the recipient selecting the voice communications identifier, establishing a telephony-based voice communications link with the recipient over a public switched telephone network (PSTN).

The inserting step can further include the step of inserting in the IM a selectable symbol denoting voice communications availability. Moreover, the inserting step can further include the steps of: inserting in the IM a reference to a sender of the IM; and, embedding computer program code in the IM, wherein the computer program code is configured to establish a voice communications link with the sender. In that case, the establishing step can include the step of, responsive to the recipient selecting the voice communications identifier, executing the embedded computer program code in order to establish a voice communications link with the sender.

The establishing step can include the steps of, responsive to the recipient selecting the voice communications identifier, determining a link address for the sender based on the reference, and executing the embedded computer program code in order to establish a voice communications link with the sender according to the determined link address. Notably, the link address can be a telephone number. Also, the link address can be an IP address.

By comparison, from the perspective of a recipient node receiving an IM transmitted by a sending node, an IM communication method can include the steps of: detecting a voice communications identifier in an IM transmitted by a sender; responsive to detecting the voice communications identifier, displaying a selectable icon; and, responsive to a selection of the icon, establishing a voice communications link with the sender. The establishing step can include the step of, responsive to the recipient selecting the voice communications identifier, establishing a Voice over IP (VoIP) based voice communications link with the recipient. Alternatively, the establishing step can include the step of, responsive to the recipient selecting the voice communications identifier, establishing a telephony-based voice communications link with the recipient over a public switched telephone network (PSTN).

Notably, the establishing step can include the steps of: extracting from the IM embedded computer program code configured to establish a voice communications link with the sender; and, responsive to the selection of the icon, executing the embedded computer program code in order to establish a voice communications link with the sender. Also, an embedded reference to the sender can be extracted from the IM. In that case, the executing step can further include the steps of: determining a link address for the sender based on the extracted reference; and, executing the embedded computer program code in order to establish a voice communications link with the sender according to the determined link address. Notably, the link address can be a telephone number. Also, the link address can be an IP address.

The invention also contemplates the transmission of an IM to multiple recipients. In that case, the method can further include the steps of extracting from the IM embedded references to the sender and at least one other recipient of the IM; and, displaying a corresponding selectable icon for each of the at least one other recipients. Additionally, responsive to a selection of one of the selectable icons, a corresponding recipient can be identified and a link address can be determined for the corresponding recipient based on the extracted reference; and, the embedded computer program code can be executed in order to establish a voice communications link with the corresponding recipient according to the determined link address. Finally, responsive to a selection of two or more of the selectable icons, a corresponding recipient can be identified for each selected icon and a link address determined for the corresponding recipients based on the extracted references; and, the embedded computer program code can be executed in order to establish a conference call with the corresponding recipients according to the determined link addresses.

In accordance with the inventive arrangements, IMs can be created, transmitted and parsed in the computer communications network. An IM article of manufacture for use with IM/Chat session clients in the computer communications network can include a header component encapsulating a reference to at least one of a sending node in the network and a recipient node in the network; a text message component encapsulating message text which can be extracted from the IM and displayed in an IM/Chat session client; and, an executable voice communications link program component configured to establish a voice communications link between the sending and recipient nodes. The voice communications link can be a Voice over IP (VoIP) based communications link. Alternatively, the voice communications link can be a telephony-based link Also in accordance with the inventive arrangements, IMs can be processed in an IM/Chat session client. An IM client configured to process an IM can include a conventional IM processor, the conventional IM processor extracting and displaying message text encapsulated in a received IM; and, a voice conversation processor, the voice conversation processor identifying a voice communications link identifier encapsulated in the received IM, displaying a selectable icon in response to detecting the voice communications link identifier and, responsive to a selection of the selectable icon, establishing a voice communications link with a sender of the received IM.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENT

The present invention is an instant message (IM) communications method and system for processing an IM which has been configured in accordance with the inventive arrangements. The method can include both a sender inserting in the IM a voice communications identifier and the sender transmitting the IM to a recipient. The recipient can detect the voice communications identifier in the IM and, in addition to displaying message text contained in the IM, the recipient can display a selectable icon. Responsive to the selection of the icon, a voice communications link can be established between the sender and the recipient. In particular, the voice communications link can be a Voice over IP (VoIP) based voice communications link over the computer communications network, or a telephony-based voice communications link over a public switched telephone network (PSTN).

Figure 1:
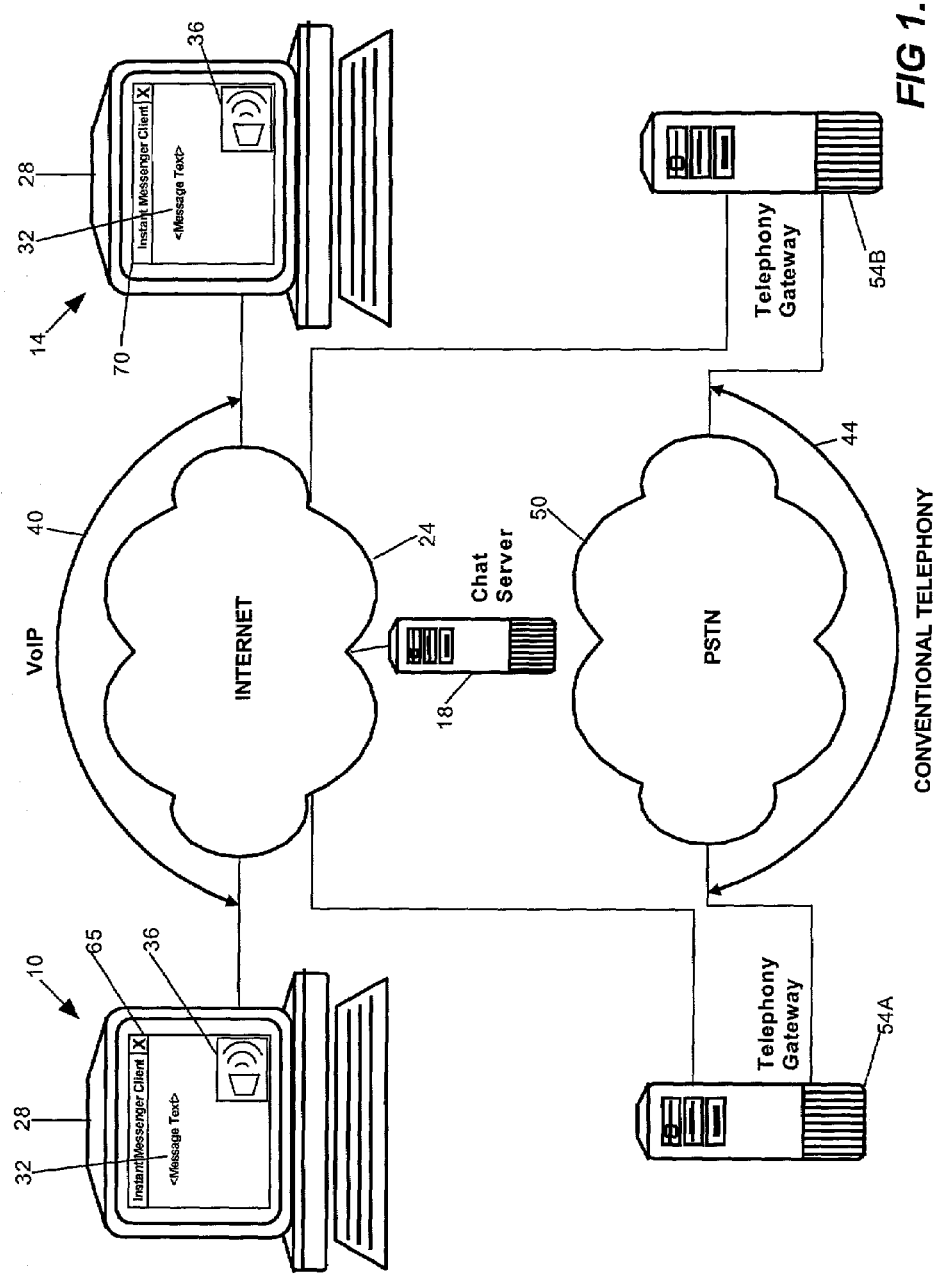
FIG. 1 is a schematic diagram of a network based instant message (IM)/chat system for use in the present invention.

An exemplary network based IM/chat system according to the invention is shown in FIG. 1. A first IM/chat client 65 in a sending node 10 and a second IM/chat client 70 in a recipient node 14 are shown although the invention can be utilized with any number and configuration of IM clients acting as both sending and receiving nodes. In one exemplary case illustrated in FIG. 1, however, IMs can be transmitted and received by the first IM client 65 over a computer communications network such as the Internet 24 through a chat 18. Similarly, IMs can be transmitted and received by the second IM client 70 over a computer communications network such as the Internet 24 through the chat server 18. Still, the invention is not limited to a particular chat server configuration and more than one chat server can be used by the first and second IM clients 65, 70 to send and receive IMs.

Once received, an IM can be parsed and the contents 32 can be displayed in the IM client 70 as is well-known in the art. Additionally, information pertaining to the sender, recipient and other pertinent data can be extracted from the IM and optionally displayed in the IM client 70. Examples of pertinent data can include references to the sender and one or more recipients such as network IP addresses. Pertinent data also can include a message subject and transmission date and time information.

Importantly, a voice communications identifier can be included in the IM to indicate that a voice communications link can be established between the sending and recipient nodes 10, 14. Upon receipt of an IM, the IM client 70 can detect the voice communications identifier when parsing the IM. Responsive to detecting a voice communications identifier in the IM, the IM client can display a selectable voice communications icon 36 which can indicate to an IM recipient that a voice communications link can be established between the sending node 10 and the recipient node 14. The icon 36 is preferably displayed within the present message text 32, although alternative placement of the icon 36 is possible. The icon 36 can be any suitable text or graphic symbol, but preferably represents voice communications to a typical viewer.

Selection of the icon 36 by a viewer can cause the establishment of a voice communications link between the recipient node 14 and the sending node 10. In particular, though the voice communications link can be provided through any suitable voice communications technology, in one aspect of the present invention, a voice communications link 40 can be provided over the Internet 24 based upon the Voice over IP (VoIP) protocol. In another aspect of the invention, a voice communications link 44 can be provided using a conventional telephony link 44 provided by conventional telephony gateways 54A, 54B over a public switched telephone network (PSTN) 50.

Figure 2:
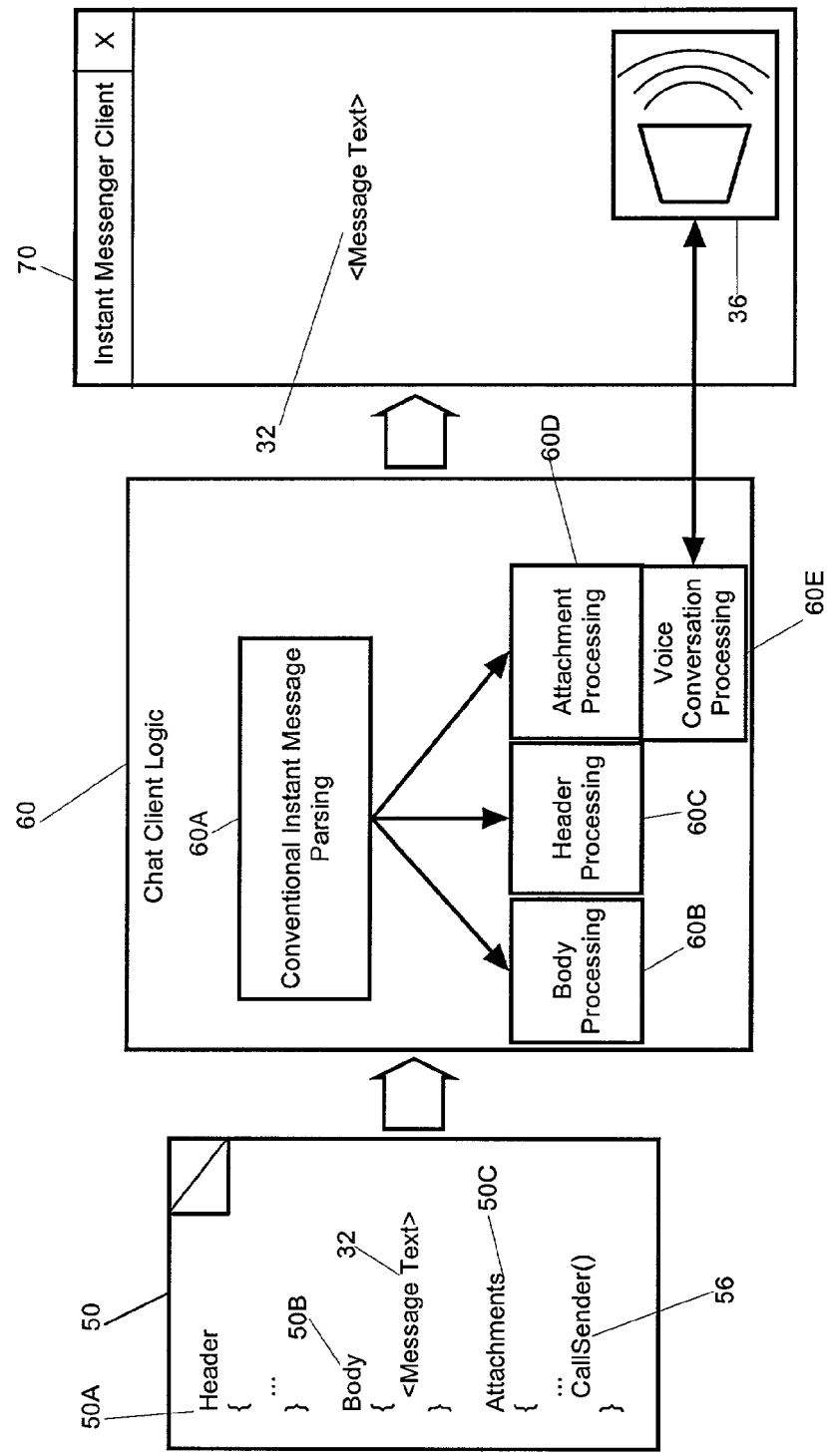
FIG. 2 is a block diagram of an IM/chat client processing an IM configured with a voice conversation feature in accordance with the inventive arrangements.

FIG. 2 is a block diagram which illustrates a process sequence in an IM client configured in accordance with the present invention. In particular, as shown in FIG. 2 an IM 50 can be configured with a voice conversation identifier 56. IM client logic 60 can process the IM 50 so that the message text 32 can be displayed in the IM client 70. IM client logic 60 also can process the IM 50 so as to detect the voice conversation identifier 56 and to responsively provide a selectable icon 36 in the IM client 70.

More particularly, in accordance with the inventive arrangements an IM 50 can be configured to include a message header component 50A which can encapsulate a reference to at least one of a sending node in the network and a recipient node in the network. The IM 50 also can be configured to include a text message component 50B which can encapsulate message text 32 which can be extracted from the IM 50 and displayed in a message client 70. Finally, the IM 50 can be configured to include an attachments component 50C which can encapsulate message attachments in addition to a voice communications identifier 56.

Notably, the voice communications identifier 56 can include basic information denoting the ability to establish a voice communications link with the sending node. Notwithstanding, the invention is not limited in this regard and in an alternative aspect of the invention, the voice communications identifier 56 can include an executable voice communications link program component. When executed, the voice communications link program can establish a voice communications link between the sending and recipient nodes.

As will be apparent to one skilled in the art, the voice communications link program component can be implemented using not only a scripting language such as Javascript or VBScript, but also the voice communications link program component can be a compiled object whose binary representation is included in the IM 50. In that case, when extracted from the IM 50, the compiled object can be independently executed without requiring intermediate script interpretation. Finally, it will be apparent to one skilled in the art that the voice communications link program can be a reference to a program residing elsewhere in a computer communications network. Selection of the reference can cause the program to be downloaded and executed in the recipient node.

Returning now to FIG. 2, IM client logic 60 associated with the IM client 70 can process the IM 50, first by parsing the contents of the IM 50 in an IM parsing component 60A. In particular, the message text 32 in the IM 50 can be extracted from the IM using body processing component 60B. Likewise, header information such as the address of the sender and recipients, can be extracted from the IM using header processing component 60C. Finally, attachments included in the IM can be processed in the attachment processing component 60D.

As shown in FIG. 2, a voice conversation processor 60E can be provided for use in the IM client logic 60. The voice conversation processor 60E can detect the presence of the voice communications link identifier 56 encapsulated in the IM 50. Responsive to detecting the voice communications link identifier 56, the voice conversation processing component 60E can cause the placement of a selectable icon 36 in the IM client 70. Subsequently, the selection of the selectable icon 36 can cause the establishment of a voice communications link between the sending node and the recipient node. Notably, the establishment of the voice communications link can be achieved through program code provided by the IM client 70, by a plug-in to the IM client, by the IM 50 itself, or by remote code referenced by either the IM client 70 or the voice communications link identifier 56.

The identity information required to establish the voice communications link can be provided in the message header component 50A. Still, the invention is not limited in this regard and the message header component 50A can merely contain a reference to the sending node and optionally recipient nodes which, in of itself, can be inadequate to establish a voice communications link. In that case, the reference can be used to retrieve the required information. For example, the reference can act as a key to a directory lookup service such as an LDAP database. Using the key, suitable identity information can be retrieved, such as an IP address, with which a voice communications link can be established.

Though only a single selectable icon 36 is shown in FIG. 2, the invention is not limited solely to the establishment of a voice communications link between the sending and recipient nodes. Rather, based upon recipient information extracted from the message header component 50A, corresponding selectable icons can be provided. Responsive to the selection of a selectable icon, a voice communications link can be established between one or more corresponding recipient nodes. Furthermore, where multiple selectable icons are provided, a conference call can be established between nodes based upon the selection of corresponding selectable icons. Finally, conference calls can established for all sender/recipients, or for selected groups of sender/recipients, such as only those recipients in a given department.

The present invention can be realized in hardware, software, or a combination of hardware and software. Moreover, the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

Significantly, this invention can be embodied in other specific forms without departing from the spirit or essential attributes thereof, and accordingly, reference should be had to the following claims, rather than to the foregoing specification, as indicating the scope of the invention.

We claim:

1. An instant message (IM) communication method comprising the steps of:

inserting in an IM a voice communications identifier;

embedding computer program code in said IM, wherein said computer program code is configured to establish a voice communications link with a sender of said IM;

transmitting said IM to a recipient;

displaying a selectable icon associated with said voice communication identifier; and, responsive to said recipient selecting said voice communications identifier, establishing a voice communications link between said recipient and said sender of said IM by executing said embedded computer program code.

2. The IM communication method of claim 1, wherein said inserting step further comprises the step of inserting in said IM a selectable symbol denoting voice communications availability.

3. The IM communication method of claim 1, wherein said inserting step further comprises the step of inserting in said IM a reference to said sender of said IM.

4. The IM communication method of claim 3, wherein said establishing step comprises the steps of responsive to said recipient selecting said voice communications identifier, determining a link address for said sender based on said reference, and executing said embedded computer program code in order to establish a voice communications link with said sender according to said determined link address.

5. The IM communication method of claim 4, wherein said link address is a telephone number.

6. The IM communication method of claim 4, wherein said link address is an IP address.

7. The IM communication method of claim 1, wherein said establishing step comprises the step of responsive to said recipient selecting said voice communications identifier, establishing a Voice over IP (VoIP) based voice communications link with said recipient.

8. The IM communication method of claim 1, wherein said establishing step comprises the step of responsive to said recipient selecting said voice communications identifier, establishing a telephony-based voice communications link with said recipient over a public switched telephone network (PSTN).

9. An instant message (IM) communication method comprising the steps of:

detecting a voice communications identifier in an IM transmitted by a sender;

responsive to detecting said voice communications identifier, displaying a selectable icon associated with said voice communication identifier;

responsive to a selection of said icon, extracting from said IM embedded computer program code configured to establish a voice communications link with said sender; and establishing a voice communications link with said sender by executing said embedded computer program code extracted from said IM.

10. The IM communication method of claim 9, further comprising the step of extracting an embedded reference to said sender from said IM.

11. The IM communication method of claim 10, wherein said executing step further comprises the steps of:

determining a link address for said sender based on said extracted reference; and, executing said embedded computer program code in order to establish a voice communications link with said sender according to said determined link address.

12. The IM communication method of claim 11, wherein said link address is a telephone number.

13. The IM communication method of claim 11, wherein said link address is an IP address.

14. The IM communications method of claim 10, further comprising the steps of:

a recipient of the IM extracting from said IM embedded references to said sender and at least one other recipient of said IM; and, displaying a corresponding selectable icon for each of said at least one other recipients.

15. The IM communication method of claim 14, further comprising the steps of:

responsive to a selection of one of said selectable icons, identifying a corresponding recipient and determining a link address for said corresponding recipient based on said extracted reference; and, executing said embedded computer program code in order to establish a voice communications link with said corresponding recipient according to said determined link address.

16. The IM communication method of claim 14, further comprising the steps of:

responsive to a selection of two or more of said selectable icons, identifying a corresponding recipient for each selected icon and determining a link address for said corresponding recipients based on said extracted references; and, executing said embedded computer program code in order to establish a conference call with said corresponding recipients according to said determined link addresses.

17. The IM communication method of claim 9, wherein said establishing step comprises the step of responsive to a recipient of the IM selecting said voice communications identifier, establishing a Voice over IP (VoIP) based voice communications link with said recipient.

18. The IM communication method of claim 9, wherein said establishing step comprises the step of responsive to a recipient of the IM selecting said voice communications identifier, establishing a telephony-based voice communications link with said recipient over a public switched telephone network (PSTN).

19. A machine readable storage having stored thereon a computer program having a plurality of code sections executable by a machine for causing the machine to perform the steps of:

inserting in an instant message (IM) a voice communications identifier;

embedding computer program code in said IM, wherein said computer program code is configured to establish a voice communications link with a sender of said IM;

transmitting said IM to a recipient;

displaying a selectable icon associated with said voice communications identifier; and, responsive to said recipient selecting said voice communications identifier, establishing a voice communications link between said recipient and said sender of said IM by executing said embedded computer program code.

20. The machine readable storage of claim 19, wherein said inserting step further comprises the step of inserting in said IM a selectable symbol denoting voice communications availability.

21. The machine readable storage of claim 19, wherein said inserting step further comprises the step of:

inserting in said IM a reference to said sender of said IM.

22. The machine readable storage of claim 21, wherein said establishing step comprises the steps of responsive to said recipient selecting said voice communications identifier, determining a link address for said sender based on said reference, and executing said embedded computer program code in order to establish a voice communications link with said sender according to said determined link address.

23. The machine readable storage of claim 22, wherein said link address is a telephone number.

24. The machine readable storage of claim 22, wherein said link address is an IP address.

25. The machine readable storage of claim 19, wherein said establishing step comprises the step of responsive to said recipient selecting said voice communications identifier, establishing a Voice over IP (VoIP) based voice communications link with said recipient.

26. The machine readable storage of claim 19, wherein said establishing step comprises the step of responsive to said recipient selecting said voice communications identifier, establishing a telephony-based voice communications link with said recipient over a public switched telephone network (PSTN).

27. A machine readable storage having stored thereon a computer program having a plurality of code sections executable by a machine for causing the machine to perform the steps of:
   detecting a voice communications identifier in an instant message (IM) transmitted by a sender;
   responsive to detecting said voice communications identifier, displaying a selectable icon associated with said voice communication identifier;
   responsive to a selection of said icon, extracting from said IM embedded computer program code configured to establish a voice communications link with said sender; and
   establishing a voice communications link with said sender by executing said embedded computer program code extracted from said IM.

28. The machine readable storage of claim 27, further comprising the step of extracting an embedded reference to said sender from said IM.

29. The machine readable storage of claim 28, wherein said executing step further comprises the steps of:
   determining a link address for said sender based on said extracted reference; and,
   executing said embedded computer program code in order to establish a voice communications link with said sender according to said determined link address.

30. The machine readable storage of claim 29, wherein said link address is a telephone number.

31. The machine readable storage of claim 29, wherein said link address is an IP address.

32. The machine readable storage of claim 28, further comprising the steps of:
   a recipient of the IM extracting from said IM embedded references to said sender and at least one other recipient of said IM; and,
   displaying a corresponding selectable icon for each of said at least one other recipients.

33. The machine readable storage of claim 32, further comprising the steps of:
   responsive to a selection of one of said selectable icons, identifying a corresponding recipient and determining a link address for said corresponding recipient based on said extracted reference; and,
   executing said embedded computer program code in order to establish a voice communications link with said corresponding recipient according to said determined link address.

34. The machine readable storage of claim 32, further comprising the steps of:
   responsive to a selection of two or more of said selectable icons, identifying a corresponding recipient for each selected icon and determining a link address for said corresponding recipients based on said extracted references; and,
   executing said embedded computer program code in order to establish a conference call with said corresponding recipients according to said determined link addresses.

35. The machine readable storage of claim 27, wherein said establishing step comprises the step of responsive to a recipient of the IM selecting said voice communications identifier, establishing a Voice aver IP (VoIP) based voice communications link with said recipient.

36. The machine readable storage of claim 27, wherein said establishing step comprises the step of responsive to a recipient of the IM selecting said voice communications identifier, establishing a telephony-based voice communications link with said recipient over a public switched telephone network (PSTN).

37. An instant message (IM)/Chat session client comprising:
   a conventional IM processor, said conventional IM processor extracting and displaying message text encapsulated in a received IM; and,
   a voice conversation processor, said voice conversation processor identifying a voice communications link identifier encapsulated in said received IM, displaying a selectable icon associated with said voice communications link identifier in response to detecting said voice communications link identifier and, responsive to a selection of said selectable icon, establishing a voice communications link with a sender of said received IM by executing computer program code embedded in said received IM, said computer program code being configured to establish the voice communications link.

* * * * *